May 12, 1970 W. KUNZ 3,511,190

PRESS FOR AGRICULTURAL FODDER OR FEED

Filed Dec. 11, 1967 2 Sheets-Sheet 1

INVENTOR
WERNER KUNZ
BY Jacobi & Davidson
ATTORNEYS

INVENTOR
WERNER KUNZ
BY Jacobi & Davidson
ATTORNEYS

United States Patent Office 3,511,190
Patented May 12, 1970

3,511,190
PRESS FOR AGRICULTURAL FODDER OR FEED
Werner Kunz, Adliswil, Switzerland, assignor to W. Kunz AG., Dintikon, Switzerland, a corporation of Switzerland
Filed Dec. 11, 1967, Ser. No. 689,437
Claims priority, application Switzerland, Dec. 14, 1966, 17,800/66
Int. Cl. A21c *11/16*
U.S. Cl. 107—14          7 Claims

ABSTRACT OF THE DISCLOSURE

A press for processing substantially fibrous agricultural fodder, such as hay for instance, which is of the type comprising an apertured substantially annular die member and a plurality of edge-runner disk members mounted at a support member. The edge runner disk members cooperate with the inner wall of the annular die member and are arranged about such inner wall in substantially crown-like formation to define therebetween a substantially central space. The annular die member and the edge-runner disk members are mounted for relative rotational movement with respect to one another. A feed worm serves to convey the fodder into the annular die member. This feed worm includes a portion which extends into the central space between the edge-runner disk members. Such an extending portion is preferably in the form of a vane-like extension of the feed worm. Further, this feed worm is mounted for rotational movement independently of the edge-runner disk members or the annular die member.

BACKGROUND OF THE INVENTION

The present invention relates to an improved press for processing, for instance briquetting, agricultural fibrous forage or fodder, such as hay, by means of an apertured, substantially annular die member, and a plurality of edge-runners or edge-runner disk members arranged at a support, such edge-runner disk members cooperating with the inner wall of the aforementioned annular die member. Furthermore, the annular die member and the edge-runner disk members are rotatable relative to one another, and additionally there is provided a feed worm or the like which serves to convey the fodder or feed into the annular die member.

With such type edge-runner presses the material which is to be compacted, for instance chaff or artificially dried hay, is generally conveyed between the annular die and the edge-runner disk members by means of a feed worm which terminates in front of the edge-runner disk members. With these type presses very little free space exists between the annular die member and the edge-runner disk members at which there can arrive between the edge-runner members the voluminous and bulky material. Thus, these presses only possess a very limited output or efficiency.

SUMMARY OF THE INVENTION

Accordingly, it is a primary object of the present invention to provide an improved press for agricultural fodder or feed which effectively overcomes the aforementioned drawbacks of the prior art structures.

Another, more specific object of this invention relates to an improved press for agricultural fodder which enables the proper processing, for instance briquetting, of substantially fibrous agricultural fodder or feed in an extremely efficient, reliable and dependable manner, with increased efficiency.

Now, in order to implement these and still further objects of the invention, which will become more readily apparent as the description proceeds, the inventive press is generally manifested by the features that the feed worm includes a portion which extends into the central space between the edge-runner disk members which are arranged in substantially crown-like fashion, and such feed worm can be rotated independently of the edge-runner disk members or the annular die member. According to one physical embodiment of the inventive press this portion of the feed worm which extends into the aforementioned central space is constructed as a vane-like extension.

By virtue of the aforementioned construction it is now possible to compress or compact unground chaff and other fibrous agricultural feed in large quantities considerably quicker than previously possible.

BRIEF DESCRIPTION OF THE DRAWINGS

The invention will be better understood, and objects other than those set forth above will become apparent, when consideration is given to the following detailed description thereof. Such description makes reference to the annexed drawings, wherein:

FIG. 1a is a partially broken away sectional view depicting a modified construction of the bores or holes of the annular die member of the instant invention.

DESCRIPTION OF THE PREFERRED EMBODIMENT

Figure 1:
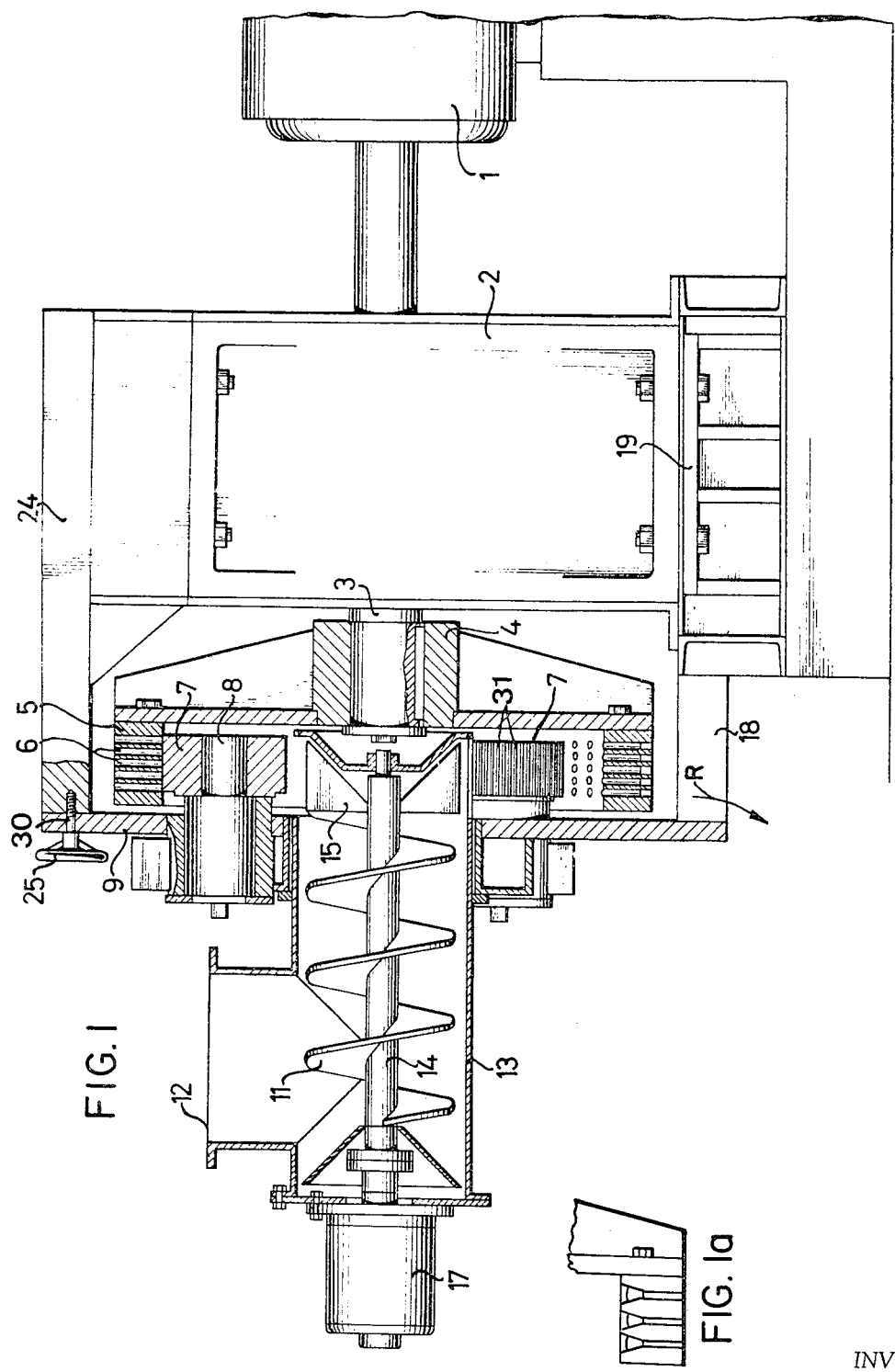
FIG. 1 is a longitudinal sectional view through the press depicted in FIG. 2, taken along the line I—I thereof.
Figure 2:
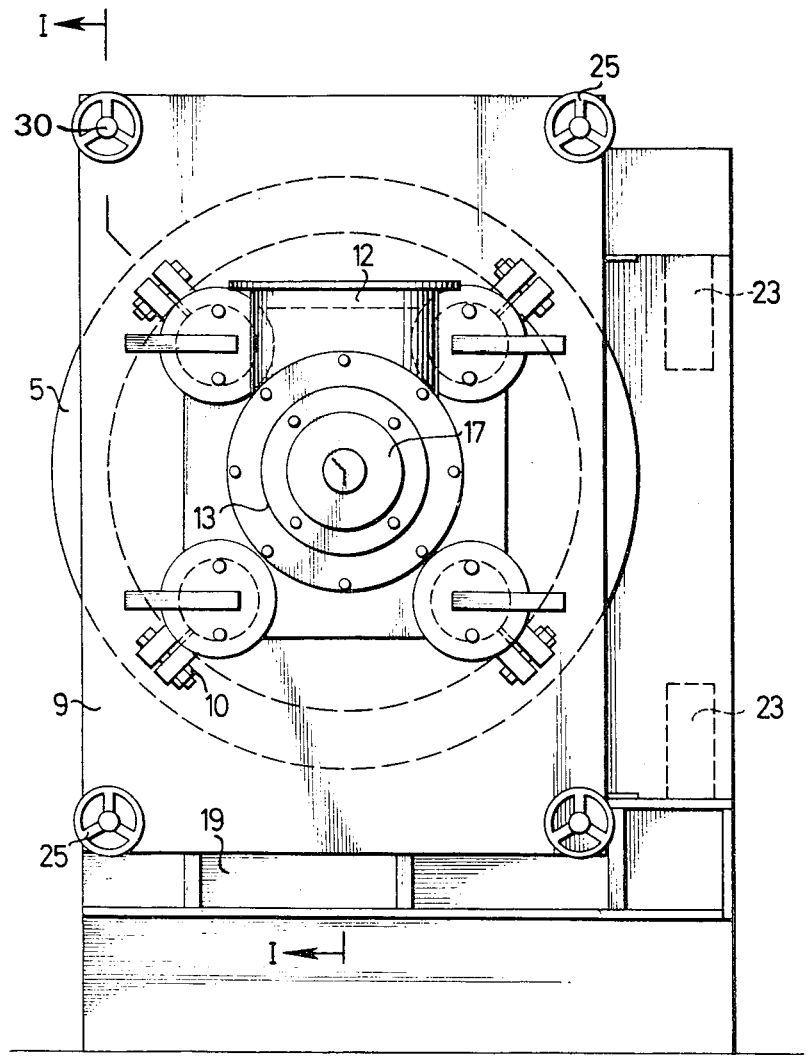
FIG. 2 is an end view of the press shown in FIG. 1.

Describing now the drawings, it should be understood that the drive of the press depicted in FIG. 1 takes place by means of a suitable electric motor or internal combustion engine 1. An appropriate transmission or gear train 2 is provided in order to step down the rotational speed. It will be understood that the power take-off shaft 3 of this transmission 2 is keyed or otherwise suitably connected with a rotor hub 4. A substantially annular die member 5 is threadably connected with the rotor hub 4 so that the die member 5 rotates together with the shaft 3. This annular die member 5 is provided with a multiplicity or radial bores 6 which are continuous, that is to say open at both ends, and are arranged about the entire periphery of said annular die member.

Continuing, it will be recognized that internally of the annular die member 5 there are located a number of so-called edge-runners or edge-runner disk members 7. In the exemplary embodiment, there are provided four such edge-runner disk members 7. Each of the latter bear with their outer or jacket surface against the inner surface or wall of the annular die member 5 and due to frictional contact with the latter are placed into rotation. Furthermore, each of these four edge-runner disk members 7 is supported by means of an eccentric pin member 8 in a vertical frontal plate member 9. Now, by appropriately rotating each of the eccentric pin members 8 about their axis it is possible to adjust each of the associated edge-runner disk members 7 in radial direction, and therefore, to compensate for wear in a very simple manner. For this purpose, the screw members 10 of the guide sleeves are loosened so that it is possible to carry out this adjustment in a very easy fashion.

Furthermore, it will be recognized that the edge-runner disk members 7 are arranged internally of the annular die member 5 in a substantially crown-like fashion, as shown, so that a relatively large free space for a feed worm 11 is provided at the central region of the annular die member 5. This feed worm 11 serves to deliver or introduce the feed or fodder which is to be compacted or compressed. As will be readily seen by inspecting FIG. 1, this feed worm 11 extends substantially coaxial with respect to the shaft member 3 and is surrounded by a suitable casing or pipe 13. The upper region of the casing 13 is provided with a suitable delivery opening 12, at which, if desired, there can also be mounted a suitable funnel member.

The feed worm 11, which is preferably of a double-screw or thread construction, is seated upon a substantially horizontal shaft member 14 which is rotatably mounted at one end. This feed worm 11 is constructed in such a manner that it displaces the material to be compressed by means of suitable ejector vanes between the edge-runner disk members 7 and the annular die member 5.

In the exemplary embodiment it will be seen that these ejector vanes or blades 15 are constructed as an axial extension of the feed worn 11 and extend into the central space between the edge-runner disk members 7. Furthermore, the shaft member 14 is driven by a suitable electric motor 17 which possesses a different rotational speed from the speed of rotation of the shaft member 3. The electric drive motor 17 can be directly flanged to the casing 13, as clearly shown in FIG. 1.

A pan or casing 18 is disposed about the annular die member 5 and serves to collect the compressed material which is pressed through the radial openings 6. The thus collected material can be removed from the pan 18 in any suitable manner in the direction of arrow R. The described apparatus including the transmission is appropriately supported upon a rigid machine frame 19. Now, in order to provide good accessability to the edge-runner disk members 7, the front plate 9 together with the four edge-runner disk members seated thereon is mounted to be pivotable about the vertical pin members 23. Also, the front plate 9 is attached to the machine housing 24 by means of four threaded bolts 30 or equivalent structure, each equipped with a respective hand wheel 25.

The diameter of the edge-runner disk members 7 is smaller than the external diameter of the feed worm 11. Moreover, the internal diameter of the annular die member 5 amounts to about three to five times, preferably about 3.3 to 3.8 times, the diameter of the edge-runner disk members 7. On the other hand, the inner diameter of the annular die member 5 preferably amounts to about 2 to 2.5 times the internal diameter of the casing or tube 13.

The mode of operation of the afore-described press is as follows: The fodder or feed which is to be compressed, for instance unground chaff, artificially dried hay, grass meal or the like, is loosely poured into the delivery opening 12. From this location it arrives by means of the feed worm 11 and the ejector vanes or blades 15 at the central hollow space between the edge-runner disk members 7. Owing to the rotation of the annular die member 5 the fodder which is to be compressed arrives between the annular die member 5 and the edge-runner disk members 7 which are provided with suitable grooves or ridges 31. The edge-runner disk members 7 then serve to press the fodder into the radial bores 6 of the annular die member 5. Within these bores 6 there occurs a pronounced compression which, if desired, can be further intensified by providing a conical construction of the bores or holes as is depicted in FIG. 1a, so that the material which previously was in loose condition is now strongly compressed by this edge-runner press and appears at the outer jacket or periphery of the annular die member 5 in substantially rod- or strand-like form. A non-illustrated suitable stripping mechanism incorporating a stationary knife cuts this compressed material, which is in the form of cylinders, for instance, into desired length, so that there now appears cubes or briquettes, which are received by the pan 18 and thereafter removed, cooled and packaged.

Furthermore, as already suggested herein, instead of four crown-like arranged edge-runner disk members 7 it would be also possible to employ a different number. With the aforedescribed construction of inventive edge-runner press the fiber structure of the fodder or feed is essentially maintained, which has proven to be significant for ruminants, such as cows.

As should now be apparent, the objects set forth at the outset of this specification have been successfully achieved.

What is claimed is:

1. A press for processing, for instance briquetting, substantially fibrous agricultural fodder, such as hay, comprising an apertured substantially annular die member, a support means, at least two edge-runner disk members mounted at said support means and cooperating with the inner wall of said annular die member, said edge-runner disk members being arranged about the inner wall of said annular die member in substantially crown-like formation to thereby define a substantially central space therebetween, said annular die member and said edge-runner disk members being mounted for relative rotational movement with respect to one another, a shaft means, a feed worm means carried by said shaft means for conveying the fodder into said annular die member, radially outwardly extending ejector vane means carried by said shaft means downstream of the end of said feed worm means, said ejector vane means lying substantially within said annular die member and having a diameter such as to approximately fill said central space between said crown-like arranged edge-runner disk members for forcibly ejecting the fodder outwardly toward said annular die means and said feed worm means being mounted for rotational movement independently of said edge-runner disk members or said annular die member.

2. A press for processing, for instance briquetting, substantially fibrous agricultural fodder, as defined in claim 1, wherein said plurality of edge-runner disk members is at least three in number, the diameter of each of which is less than the diameter of said feed worm means.

3. A press for processing, for instance briquetting, substantially fibrous agricultural fodder, as defined in claim 2, wherein the diameter of each of said edge-runner disk members is less than one-third of the inner diameter of said annular die member.

4. A press for processing, for instance briquetting, substantially fibrous agricultural fodder, as defined in claim 1, further including drive means for said annular die member and separate drive means for said feed worm means.

5. A press for processing, for instance, briquetting substantially fibrous agricultural fodder, such as hay, comprising an apertured substantially annular die member, a support means, at least two edge-runner disk members mounted at said support means and cooperating with the inner wall of said annular die member, said edge-runner disk members being arranged about the inner wall of said annular die member in susbtantially crown-like formation to thereby define a substantially central space therebetween, said annular die member and said edge-runner disk members being mounted for relative rotational movement with respect to one another, a feed worm means for conveying the fodder into said annular die member, said feed worm means including a portion thereof defining radially outwardly extending vane means projecting into said central space between said crown-like arranged edge-runner disk members for ejecting fodder, said feed worm means being mounted for rotational movement independently of said edge-runner disk members or said annular die member, said press further including a stationary machine frame at which said annular die member is rotatably mounted, drive means for driving said annular die member, said support means for said edge-runner disk members incorporating a front plate member carried by said stationary machine frame and means for pivotably mounting said front plate member together with said edge-runner disk members for pivotal movement relative to said annular die member about a pivot axis extending substantially transverse to the axis of said annular die member.

6. A press for processing, for instance briquetting, substantially fibrous agricultural fodder, as defined in claim 5, wherein said drive means comprises a drive motor.

7. A press for processing, for instance briquetting, substantially fibrous agricultural fodder, as defined in claim 5, wherein said support means further includes eccentric pin means for rotatably mounting each of said edge-runner disk members, each of said eccentric pin means being supported at one end by said front plate member.

References Cited

UNITED STATES PATENTS

| | | | |
|---|---|---|---|
| 1,238,981 | 9/1917 | Barton. | |
| 2,063,404 | 12/1936 | Selman | 107—8 |
| 2,336,114 | 12/1943 | Meakin | 107—8 |
| 2,391,638 | 12/1945 | Meakin | 18—12 |
| 3,010,150 | 11/1961 | Meakin | 18—12 |
| 3,203,367 | 8/1965 | Lamp | 107—14 |
| 3,332,111 | 7/1967 | Hafliger | 18—12 |

BILL J. WILHITE, Primary Examiner

U.S. Cl. X.R.

18—12